United States Patent [19]

Artigalas et al.

[11] Patent Number: 5,027,287
[45] Date of Patent: Jun. 25, 1991

[54] DEVICE FOR THE DIGITAL PROCESSING OF IMAGES TO OBTAIN SPECIAL GEOMETRICAL EFFECTS

[75] Inventors: Max Artigalas, Le Chesnay; Jean-Luc Grimaldi, Ermont, both of France

[73] Assignee: Thomson Video Equipement, Cergy Saint Christophe, France

[21] Appl. No.: 362,349

[22] Filed: Jun. 6, 1989

[30] Foreign Application Priority Data

Jun. 7, 1988 [FR] France ............................. 88 07541

[51] Int. Cl.$^5$ ..................... G06F 15/66; H04N 9/74
[52] U.S. Cl. ........................ 364/518; 358/22; 382/44; 364/521
[58] Field of Search ................ 364/521, 518; 382/47, 382/44, 56; 358/22

[56] References Cited

U.S. PATENT DOCUMENTS

| | | | |
|---|---|---|---|
| 4,432,009 | 2/1984 | Reitmeier et al. | 358/22 |
| 4,665,433 | 5/1987 | Hinson et al. | 358/22 |
| 4,760,605 | 7/1988 | David et al. | 382/47 |
| 4,774,678 | 9/1988 | David et al. | 364/518 |
| 4,831,447 | 5/1989 | Lake, Jr. | 358/183 |

FOREIGN PATENT DOCUMENTS 2158322 11/1985 United Kingdom .
2174861 11/1986 United Kingdom .

OTHER PUBLICATIONS

Toute L'Electronique, No. 460, Jan. 1981, pp. 23–28, A. Le Toquin.
Computer Graphics & Image Processing, vol. 13, No. 2, Jun. 1980, pp. 127–141, C. Braccini et al.

Primary Examiner—Gary V. Harkcom
Assistant Examiner—Raymond J. Bayerl
Attorney, Agent, or Firm—Oblon, Spivak, McClelland, Maier & Neustadt

[57] ABSTRACT

The obtaining of a geometrical effect, with an image, is done by a two-dimensional filter with variable characteristics controlled by a computer to compute the points of a pre-established conversion grid, superimposed on the image, as a function of neighboring points of the original image and of the desired effect. A memory contains the original image. Auxiliary images, obtained by successive reductions, in fixed proportion, of the original image, are stored and a point of the conversion grid is computed by selecting that of the memories for which the reduction factor enables the easiest computation while, at the same time, preserving the quality of the image.

3 Claims, 2 Drawing Sheets

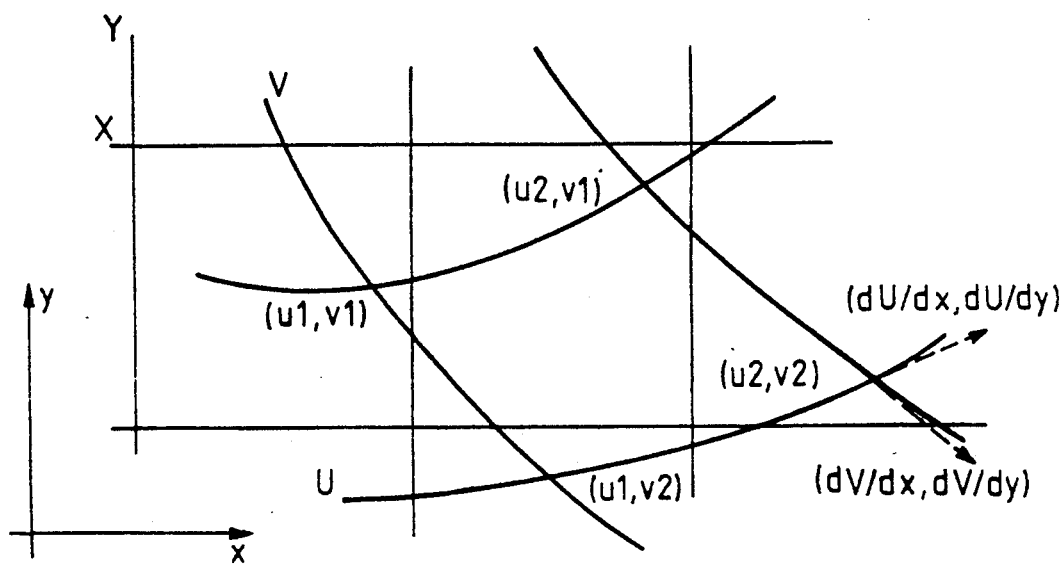
FIG_1
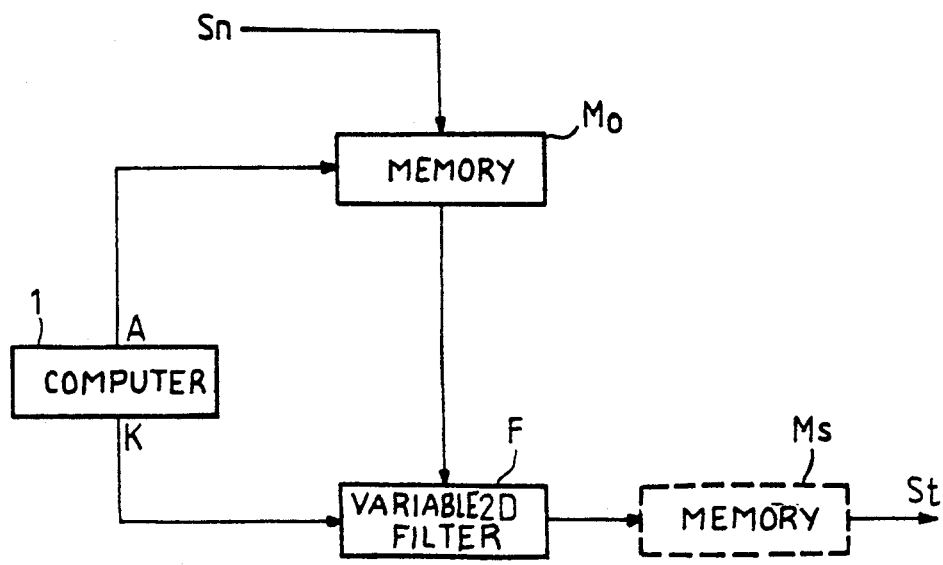
FIG_2  PRIOR ART

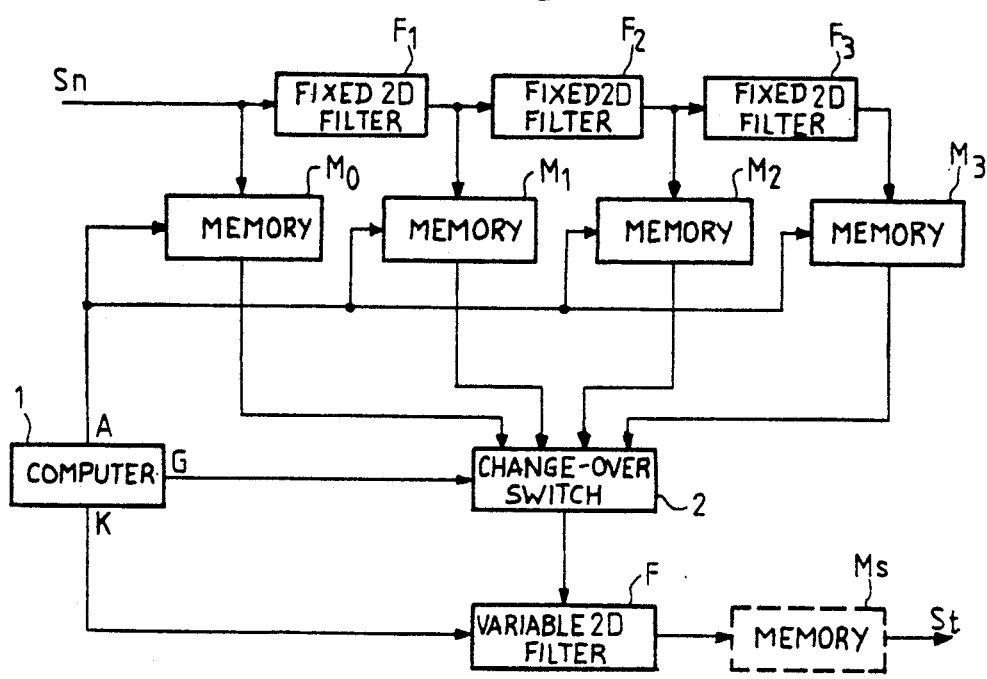
FIG_3
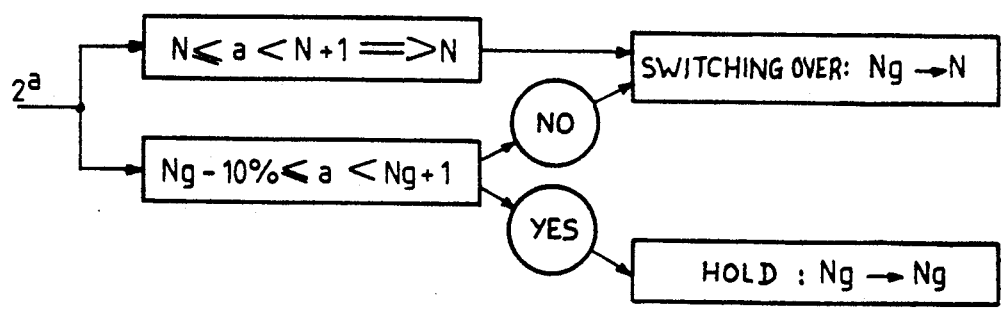
FIG_4

DEVICE FOR THE DIGITAL PROCESSING OF IMAGES TO OBTAIN SPECIAL GEOMETRICAL EFFECTS

BACKGROUND OF THE INVENTION

1. Field of the Invention

The present invention concerns the digital processing of images, for the obtaining of special geometrical effects. The processing is done using an original image formed by digital signals, representing points distributed along the intersections of a rectangular grid formed by rows and columns. The processing consists in modifying the geometry of the original image to obtain, for example, the appearance of a projection of the image on a curved surface, or a reduction, namely a simple change in scale of the image.

In a known method to achieve these special effects, the conversion grid, the rows and columns of which can be curved, is determined, this grid is superimposed on the original rectangular grid, and their points of intersection are determined by interpolation, using the neighboring points on the original grid; the points of the conversion grid are then carried over to a rectangular grid, having the same number of rows and columns and the special effect is obtained. To correct aliasing phenomena, namely the conversion of high frequencies of the spectrum into low frequencies, a known method lies in determining each point of intersection by bringing into play two factors, called local compression factors, equal to the respective norms of the vectors respectively tangential to the row and column at the point considered.

It must be noted that the smaller the final image as compared with the original image, the greater is the number of neighboring points that are to be taken into account in determining, by interpolation, the points of the new grid in order to minimize the aliasing phenomena. Thus, when the final image is smaller than the original image, the prior art devices require long computation periods to prevent the aliasing phenomenon.

SUMMARY OF THE INVENTION

The present invention is aimed at preventing or, at least, reducing these drawbacks. This is obtained by successively reducing, and storing, the image, and then obtaining the desired image from the images stored. The stored image is selected, for the determining of each point of the final image, as a function of the local compression factors of the point considered and of the coefficients of reduction of the stored images.

According to the invention, there is provided a digital processing device for obtaining special geometrical effects from an original image formed by digital signals representing points distributed along the intersections of a rectangular grid formed by rows and columns, said device comprising an image memory (M0) to preserve the original image, a two-dimensional filter (F) with variable characteristics and a computer to control, as a function of a pre-established conversion grid, and as a function of the compression factors of this conversion grid, the computation, by the filter, of the digital values to be assigned to the intersections of the conversion grid, said device also comprising n, where n is a whole number at least equal to 1, auxiliary two-dimensional filters (F1–F3), with fixed characteristics, placed in series and each having one output, where the first auxiliary filter in the series receives the digital signals of the original image, n memories (M1–M3) respectively connected to the outputs of the n auxiliary filters and a change-over switch 2 to switch one of the n+1 memories (M0–M3) over to the filter with variable characteristics F, with the computer activating the change-over switch as a function of the compression factors G of the conversion grid.

BRIEF DESCRIPTION OF THE DRAWINGS

The present invention will be better understood and other characteristics will appear from the following description, and the figures pertaining thereto, of which:

FIG. 1 shows two grids used to produce a geometrical effect in an image;

FIG. 2 is a diagram of a prior art device for the obtaining of a geometrical effect;

FIG. 3 is a diagram of a device according to the invention for the obtaining of a geometrical effect;

FIG. 4 is a flowchart relating to FIG. 3.

In the various diagrams, the precise synchronization devices, coming under standard technology, have not been shown in order to make the diagrams clearer and to simplify the explanation.

MORE DETAILED DESCRIPTION

FIG. 1 gives a partial view of two grids, one rectangular, formed by horizontal rows X and vertical columns Y, while the other is formed by curved rows and columns U, V. The rectangular grid represents, by its intersection points, the position of the points of an original image, and the points of the original image are known by digital signals. This grid shall hereinafter be called an original grid. The other grid is a transposition grid, namely a grid for which the intersection points, computed by interpolation from the neighbouring points of the original grid, are carried over to the intersections of a rectangular grid having the same number of rows and columns as the transposition grid. It is through this process that the achieving of special geometrical effects from an original image is known.

It should be further noted that, following Shannon's theorem, it is necessary to determine appropriate sampling spectra in the directions of the curves U and V, to prevent aliasing phenomena that create faults. For this purpose, the associating, with each point (u, v), of two factors called local compression factors, along the tangents to the curves U and V, is known. These local compression factors are equal to the respective norms of the vectors tangential to the curves U and V:

$$C_U = \sqrt{(dU/dx)^2 + (dU/dy)^2}$$

$$C_V = \sqrt{(dV/dx)^2 + (dV/dy)^2}$$

In these formulae, $C_U$ and $C_V$ represent, respectively, the compression factors along U and V. Values that are a little less precise, but simpler to obtain, can be determined by means of the chord that subtends two consecutive points. Thus at the point (u2, v2) of FIG. 1

$$C_U = \sqrt{(x2,2 - x1,2)^2 + (y2,2 - y2,1)^2}$$

$$C_V = \sqrt{(x2,2 - x2,1)^2 + (y2,2 - y2,1)^2}$$

These compression factors, irrespectively of how they are defined, depend on the curves U and V, which define the special effect, and on the pitch of the original grid. The greater the compression factor, the greater is the number of points of the original grid to be taken into account to determine, by interpolation, a point of the conversion grid in order to minimize the aliasing phenomenon. FIGS. 3 and 4 will make it possible to show how, in order to avoid making lengthy computations or having a large number of electronic circuits to take into account a large number of points of the original grid when the compression factors are great, it is possible to do the computations not from the original grid alone, but from a set of grids deduced from one another by simple reductions using two-dimensional filters placed in series.

FIG. 2 is a diagram illustrating the prior art, referred to above, to achieve a special geometrical effect. The digital signals Sn, representing points of an original image distributed along the intersection of a rectangular grid are stored in a memory $M_O$ called an original image memory. A computer 1 has the data of the conversion grid: the address of the points of the original grid and compression factors to be taken into account for each intersection point of the conversion grid. The computer 1 activates, by an addressing signal A, the dispatch from the memory $M_O$, to a two-dimensional filter F, of the signals of the original image to be used for the computation, by interpolation, of a point of the conversion grid. The computer also sends the filter F a signal K giving the two compression factors relating to the point to be computed. The filter F is a two-dimensional filter with a variable compression rate controlled by the signal K. This filter gives, either directly if the work is done in real time, or with storage in a memory grid Ms, a signal St corresponding to the signal Sn converted according to the special geometrical effect desired.

Should the special effect desired be a simple reduction, i.e. a change in scale of the image, the computation by interpolation and the circuit of FIG. 2 are simplified: the computer 1 is eliminated and a two-dimensional filter with a fixed compression rate is used as the filter F, and the computation by interpolation is then done systematically in the same way for all the points of the conversion grid.

FIG. 3 shows a circuit with which the computations, done by interpolation, of the points of the conversion grid are simplified in comparison with the corresponding computations done in the circuit of FIG. 2.

In the circuit according to FIG. 3, the signal Sn is always sent into an original image memory $M_O$, but it is also sent through three auxiliary filters $F_1$, $F_2$, $F_3$ to three image memories $M_1$, $M_2$, $M_3$. The auxiliary filters $F_1$, $F_2$, $F_3$ are two-dimensional filters with fixed compression rate, having a value 2 in the example described. It is therefore a simple image reduction which, as indicated during the description of FIG. 2, is done very simply.

Thus, in the memories $M_0$, $M_1$, $M_2$, images are stored with an increasingly low resolution since their compression factor $2^N$, with respect to the original image, is respectively $2^0=1$, $2^1=2$, $2^2=4$, $2^3=8$.

A computer 1 having, for one and the same special effect, the data corresponding to the same conversion grid as the computer of FIG. 2, will thus be capable of choosing between the contents of the memories $M_0$ to $M_3$ to trigger computation, by interpolation, of a point of the conversion grid. This computation is done with the same two-dimensional filter F as in the case of FIG. 2. The filter F receives the image signals stored in the memories $M_0$ to $M_3$ through a change-over switch 2, with four inputs and one output.

The choice of one of the four memories $M_0$ to $M_3$ is done as a function of the smallest of the two compression factors associated with the point to be determined. If $2^a$ and $2^b$ are these factors, with a smaller than b, the memory chosen is that for which the compression factor $2^N$ is such that:

$$N \leq a < N+1$$

it being understood that, should $a-1$ be greater than the maximum value of N, i.e. greater than 3, it is the memory for which the compression rate equals $2^3=8$ that is chosen. A correction is made to the choice if the value of a should be smaller, by more than 10%, than the values $N = Ng$ of the compression factor $2^N$ of the memory chosen to compute the preceding point. This correction, which is not indispensable, consists in retaining the preceding value Ng. This makes it possible to reduce the faults introduced by the switching over of the memories. The method of choosing among the four memories, that has just been described, is illustrated by the flowchart of FIG. 4: the switching over of the memory by the change-over switch 2 is permitted only if a is outside the range Ng-10%, inclusive of the limit, or Ng+1 excluding the limit.

The computer 1 gives a signal G to activate the change-over switch 2. This signal G is obtained according to the flowchart of FIG. 4. It should be noted, besides, that the address signals, A, sent by the computer 1 to the memory $M_0$ to $M_3$, are the same as in the case of FIG. 2 and are the same irrespectively of the memory chosen. In effect, in the example described, where the memories $M_0$ to $M_3$ contain a number of signals that decrease according to a geometrical sequence of 2, the signal G is formed by groups of eight addresses concerning eight points of the memory $M_0$, four points of the memory $M_1$, two points of the memory $M_2$ and only one point of the memory $M_3$. It should also be noted that it is the same signal K as in the circuit of FIG. 2 that gives the compression factors to the filter F of FIG. 3.

As in the case of FIG. 2, the filter F of FIG. 3 is followed by a memory Ms unless the work is done in real time.

The present invention is not restricted to the example described. Thus, in particular, the number of auxiliary filters, such as the filters F1, F2, F3 of FIG. 3, may be different from three, it being understood that there should be at least one auxiliary filter, and that, in this case, the switching over by the change-over switch 2 will be done between two memories, the image memory and the memory placed at the output of the single auxiliary filter. Similarly, the compression rates of the auxiliary filters may be other than 2, and may even be different from one another for filters of one and the same device.

What is claimed is:

1. A digital processing device for obtaining special geometrical effects from an original image formed by digital signals representing points distributed along the intersections of a rectangular grid formed by rows and columns, said device comprising an image memory (MO) to preserve the original image, a two-dimensional filter (F) with variable characteristics and a computer to control, as a function of a pre-established conversion grid, and as a function of the compression factors of this conversion grid, the computation, by the filter, of the digital values to be assigned to the intersections of the conversion grid, said device also comprising n, where n is a whole number at least equal to 1, auxiliary two-dimensional filters, with fixed characteristics, placed in series and each having one output, where the first auxiliary filter in the series receives the digital signals of the original image, n memories (M1–M3) respectively connected to the outputs of the n auxiliary filters and a change-over switch 2 to switch one of the n+1 memories (M0–M3) over to the filter with variable characteristics F, with the computer activating the change-over switch as a function of the compression factors G of the conversion grid.

2. A device according to claim 1, wherein the auxiliary filters all have the same compression rate.

3. A device according to claim 2, wherein the compression rate of the auxiliary filters is 2.

* * * * *